: US 10,980,225 B2
(45) Date of Patent: Apr. 20, 2021

(54) APPARATUS FOR DISPENSING A TREATMENT LIQUID TO A RESPECTIVE AGRICULTURAL CROP

(71) Applicant: NOBILI S.p.A., Molinella (IT)

(72) Inventor: Mario Rossi, Molinella (IT)

(73) Assignee: NOBILI S.P.A., Molinella (IT)

( * ) Notice: Subject to any disclaimer, the term of this patent is extended or adjusted under 35 U.S.C. 154(b) by 30 days.

(21) Appl. No.: 15/771,357

(22) PCT Filed: Oct. 26, 2016

(86) PCT No.: PCT/IB2016/056432
§ 371 (c)(1),
(2) Date: Apr. 26, 2018

(87) PCT Pub. No.: WO2017/072670
PCT Pub. Date: May 4, 2017

(65) Prior Publication Data
US 2018/0352797 A1 Dec. 13, 2018

(30) Foreign Application Priority Data

Oct. 27, 2015 (IT) .................. 102015000066009

(51) Int. Cl.
*A01M 7/00* (2006.01)
*A01C 23/04* (2006.01)
(Continued)

(52) U.S. Cl.
CPC ......... *A01M 7/0014* (2013.01); *A01C 23/047* (2013.01); *A01M 7/005* (2013.01);
(Continued)

(58) Field of Classification Search
CPC ....... B05B 1/205; B05B 7/0075; B05B 1/202; A01M 7/0003; A01M 7/0014; A01M 7/006; A01M 7/005; A01C 23/047
(Continued)

(56) References Cited

U.S. PATENT DOCUMENTS 2,746,794 A * 5/1956 Fish ............... A01M 7/0014
239/77
2,899,138 A * 8/1959 Williamson ........ A01M 7/0014
239/77

(Continued)

FOREIGN PATENT DOCUMENTS

| AT | 371665 T | 9/2007 |
|----|----------|--------|
| FR | 1506530 A | 12/1967 |
| WO | WO8801539 A1 | 3/1988 |

OTHER PUBLICATIONS

International Search Report dated Feb. 23, 2017 from counterpart PCT App No. PCT/IB2016/056432.
(Continued)

*Primary Examiner* — Joseph A Greenlund
(74) *Attorney, Agent, or Firm* — Shuttleworth & Ingersoll, PLC; Timothy J. Klima

(57) ABSTRACT

An apparatus for dispensing a treatment liquid to a respective agricultural crop, including means for diffusing the treatment liquid, which comprise means for emitting a flow of air for diffusion of the treatment liquid, in particular fan-style diffusion, and means for dispensing the treatment liquid inside the flow of air for diffusing the treatment liquid, connected with means, in particular a respective tank for containing the treatment liquid; the dispensing means including a dispensing body having an inner chamber for conveying the liquid, respective inlet opening means of the treatment liquid, and nozzle means for escape of the liquid in the flow of air for diffusion of the treatment liquid, in (Continued)

communication with or opening into the inner conveying chamber; the inlet into the conveying chamber being defined by a plurality of openings leading into the inner chamber for conveying the liquid.

18 Claims, 15 Drawing Sheets

(51) Int. Cl.
  *B05B 1/20* (2006.01)
  *B05B 7/00* (2006.01)
(52) U.S. Cl.
  CPC .............. *A01M 7/006* (2013.01); *B05B 1/205* (2013.01); *B05B 7/0075* (2013.01)
(58) Field of Classification Search
  USPC .............................. 239/77, 78, 161, 162, 14.2
  See application file for complete search history.

(56) References Cited

U.S. PATENT DOCUMENTS

| | | | | |
|---|---|---|---|---|
| 2,925,222 A * | 2/1960 | Spreng | ................. | B05B 7/0075 239/78 |
| 3,138,329 A * | 6/1964 | Swanson | ............. | A01M 7/0014 239/77 |
| 3,164,324 A * | 1/1965 | Bruinsma | ........... | A01M 7/0014 239/77 |
| 3,216,664 A * | 11/1965 | Wolford | .............. | A01M 7/0014 239/77 |
| 3,269,657 A * | 8/1966 | Ballu | ................... | A01M 7/0003 239/77 |
| 3,504,854 A * | 4/1970 | Kinkelder | ........... | A01M 7/0014 239/78 |
| 3,517,888 A * | 6/1970 | Mitterer | ................ | B05B 7/0075 239/579 |
| 3,625,426 A * | 12/1971 | Swanson | ............ | A01M 7/0014 239/77 |
| 4,396,157 A * | 8/1983 | Inculet | ................ | A01M 7/0014 239/598 |
| 4,673,132 A * | 6/1987 | Inculet | .................... | B05B 5/043 239/706 |
| 5,740,962 A * | 4/1998 | Manor | ................ | A01M 7/0014 239/77 |
| 5,921,019 A * | 7/1999 | Baek | ................... | A01M 7/0089 47/1.7 |
| 5,996,904 A * | 12/1999 | Smeraldi | ............. | A01M 7/0014 239/77 |
| 6,740,641 B2 | 5/2004 | Gao et al. | | |
| 10,076,075 B1 * | 9/2018 | Muff | ........................ | B05B 1/20 |
| 10,154,661 B2 * | 12/2018 | Kubacak | ............ | A01M 21/043 |
| 2006/0214022 A1 * | 9/2006 | Caccaviello | .......... | B05B 13/005 239/172 |
| 2018/0352797 A1 * | 12/2018 | Rossi | ................... | A01M 7/0014 |
| 2019/0116742 A1 * | 4/2019 | Denton | ................. | A01G 25/02 |

OTHER PUBLICATIONS

International Preliminary Report dated Feb. 9, 2018 from counterpart PCT App No. PCT/IB2016/056432.

\* cited by examiner

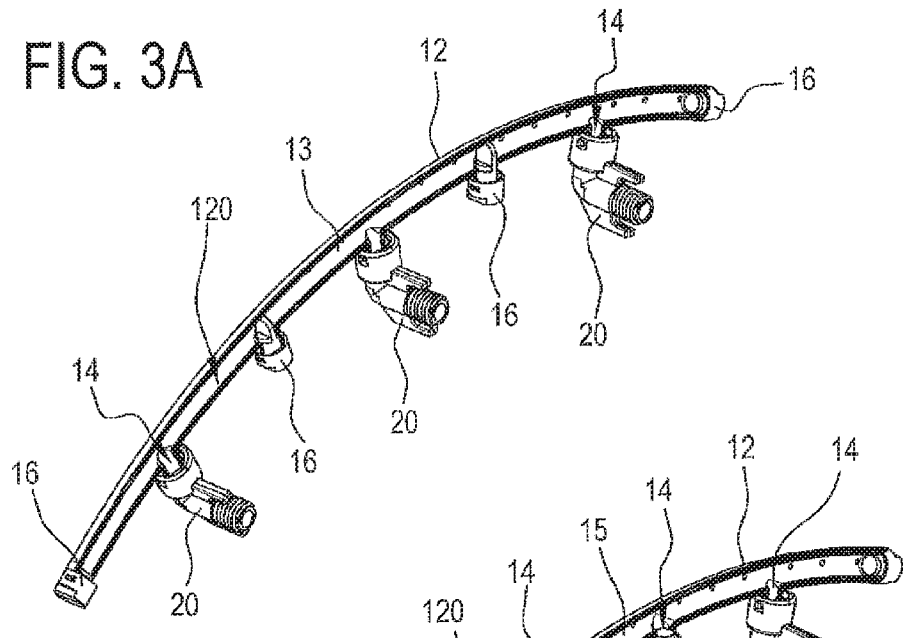
FIG. 3A
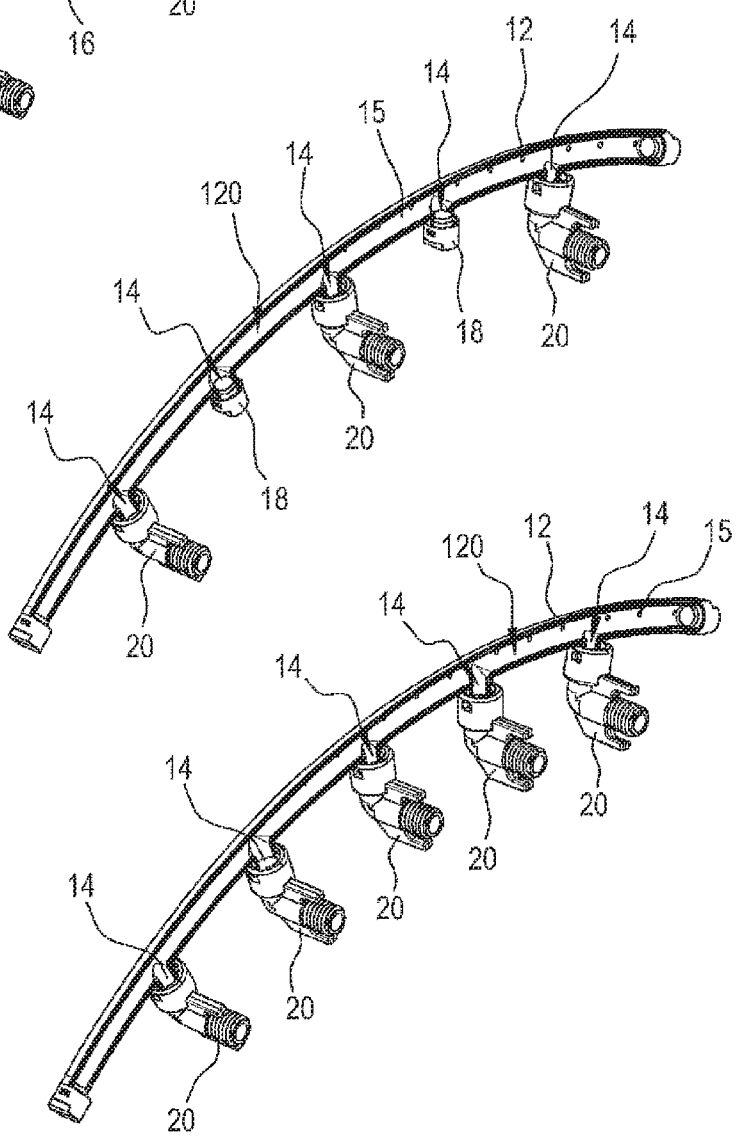
FIG. 3B
FIG. 3C

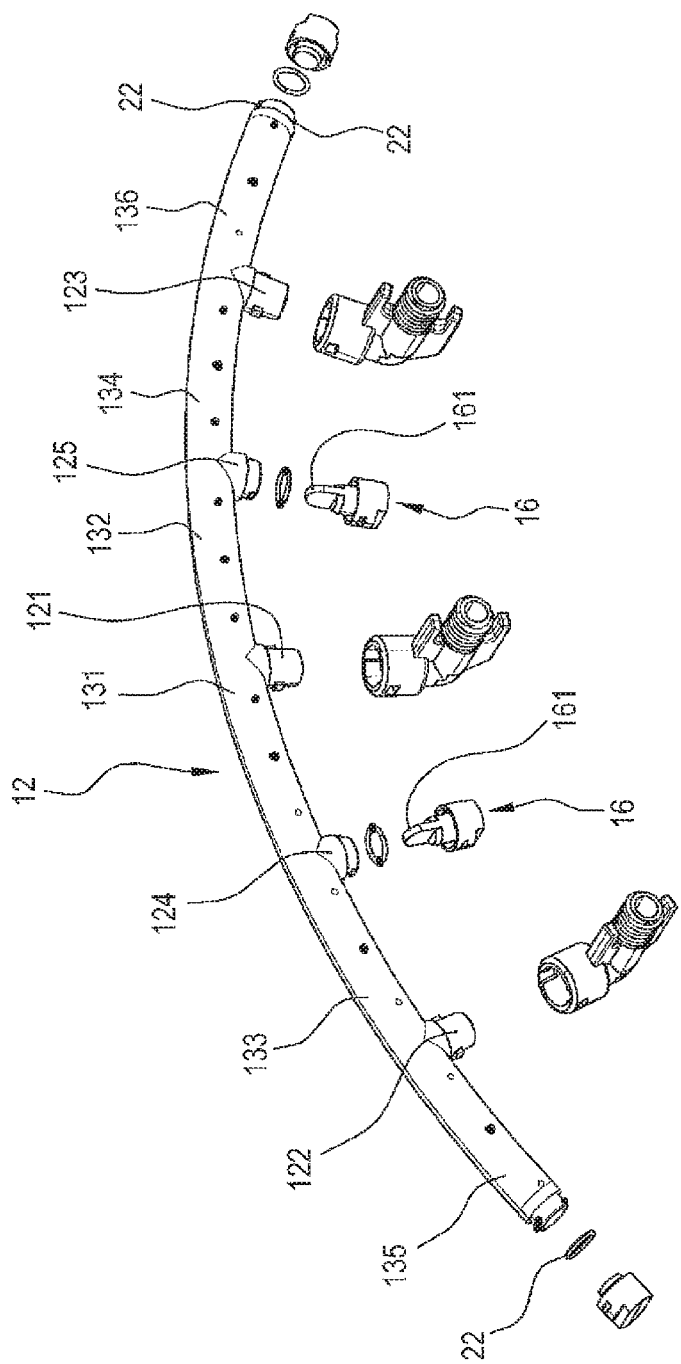

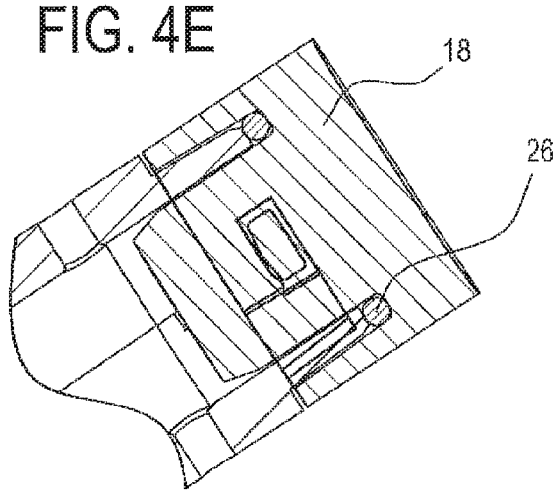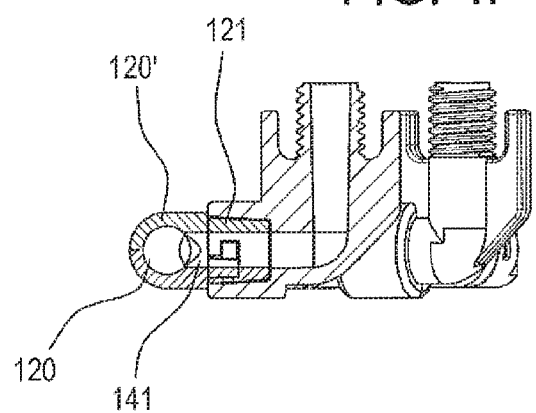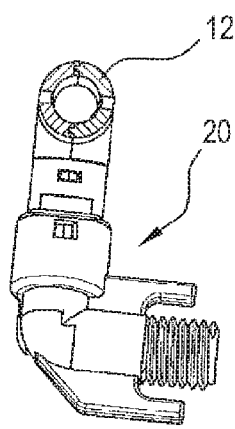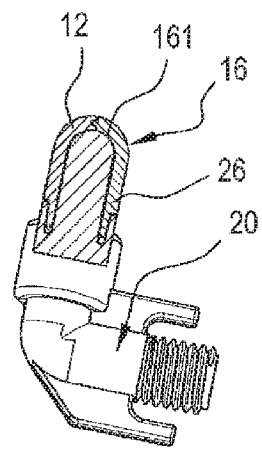

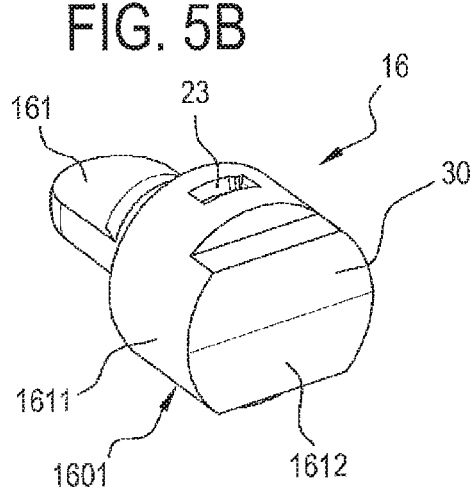
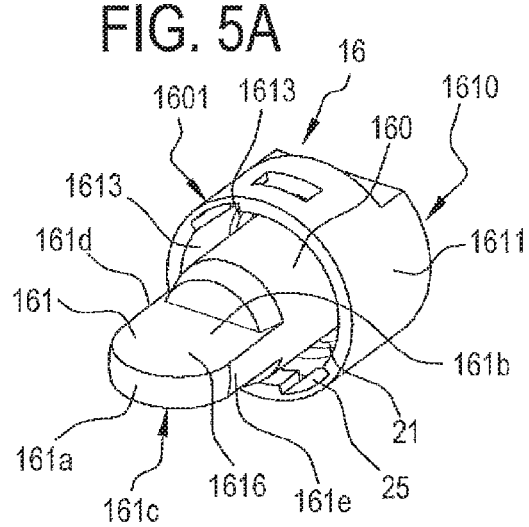
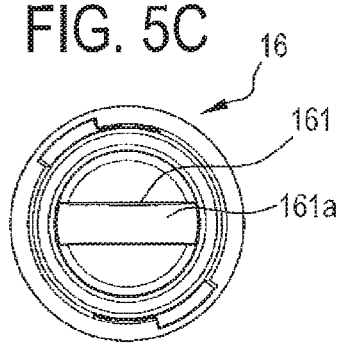
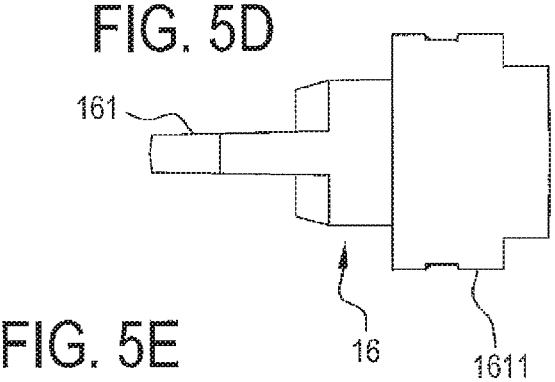
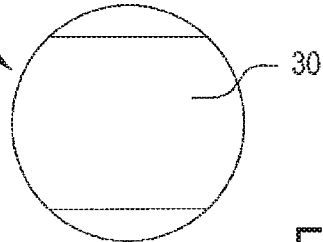
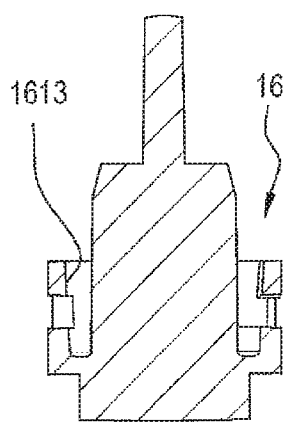
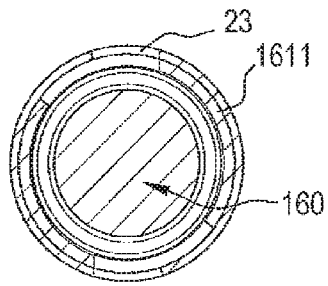

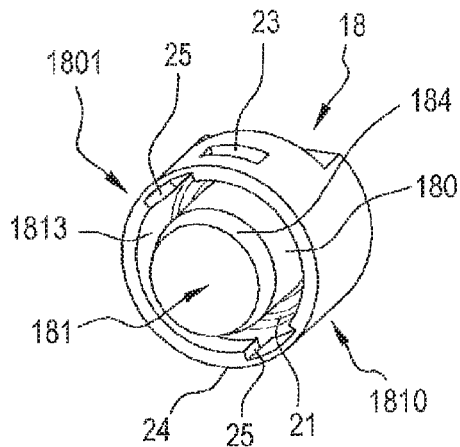
FIG. 6B
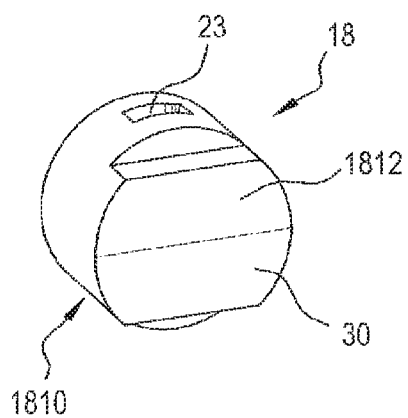
FIG. 6A
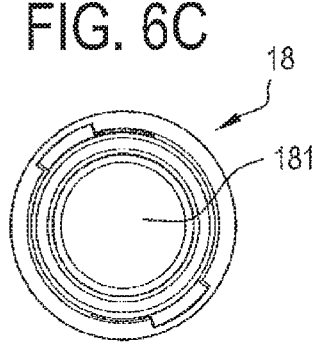
FIG. 6C
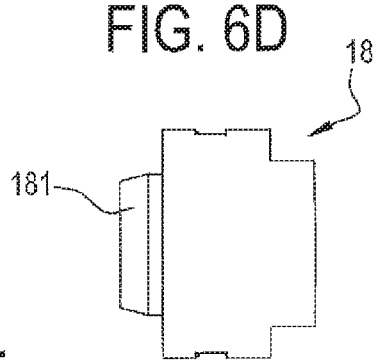
FIG. 6D
FIG. 6E
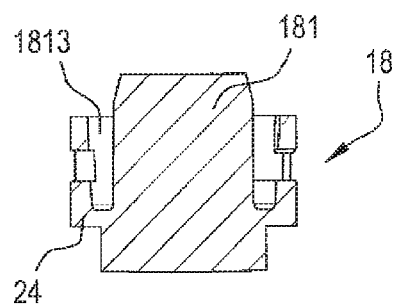
FIG. 6F
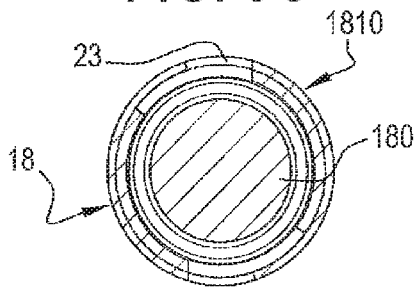
FIG. 6G

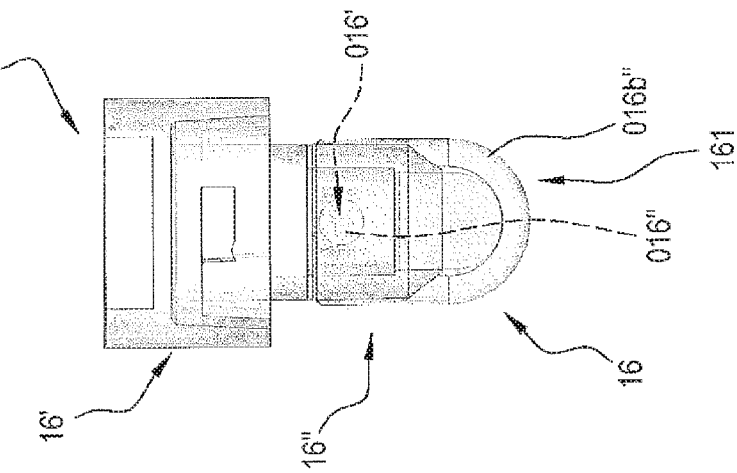
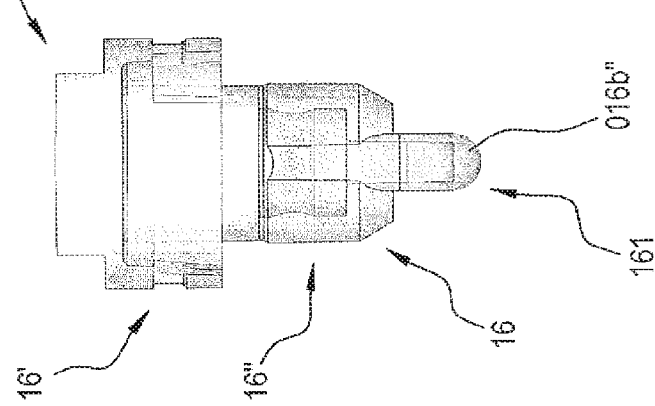
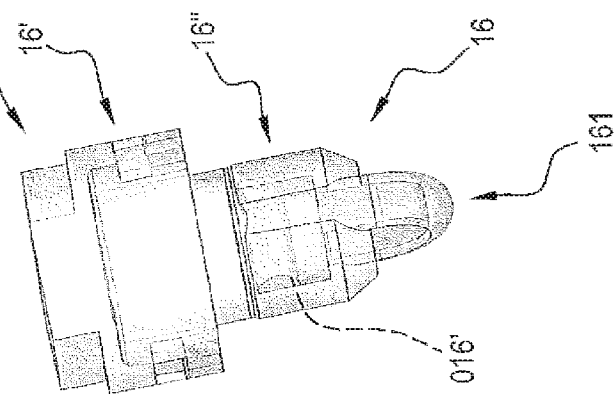

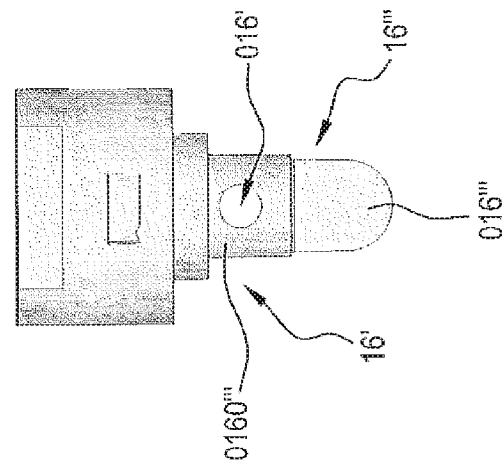
FIG. 9A    FIG. 9B
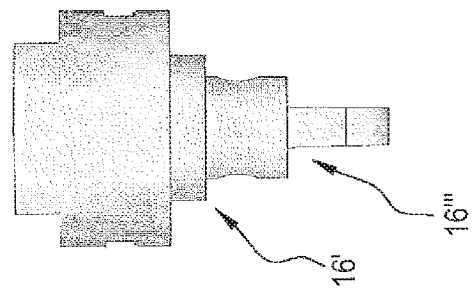
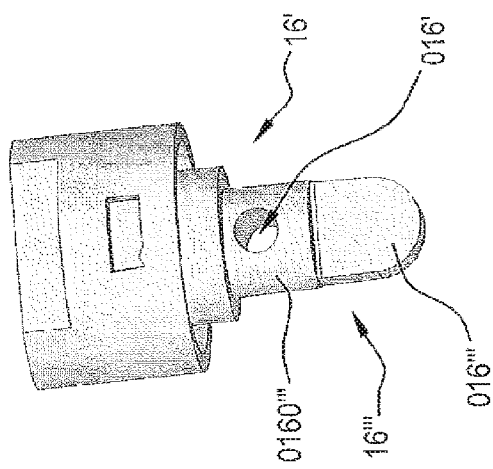
FIG. 9C

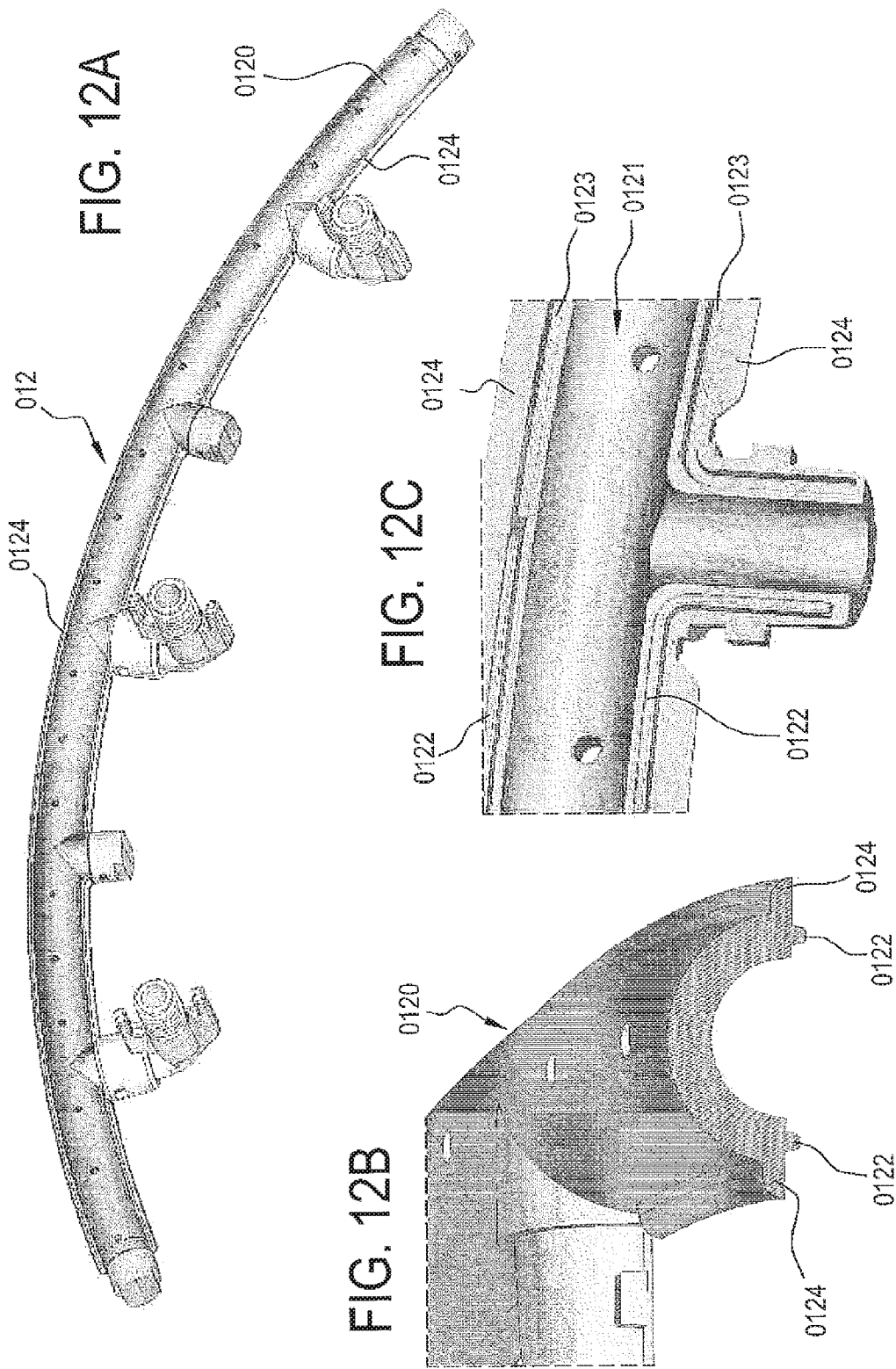

APPARATUS FOR DISPENSING A TREATMENT LIQUID TO A RESPECTIVE AGRICULTURAL CROP

This application is the National Phase of International Application PCT/IB 2016/056432 filed Oct. 26, 2016 which designated the U.S.

This application claims priority to Italian Patent Application No. 102015000066009 filed Oct. 27, 2015, which application is incorporated by reference herein.

TECHNICAL FIELD

This invention relates to an apparatus for dispensing a treatment liquid to a respective agricultural crop.

BACKGROUND ART

There are prior art apparatuses for dispensing a treatment liquid, in particular in a nebulised or atomised condition, on a respective agricultural crop, which comprise means for diffusing the treatment liquid having means for fan-style emission of a flow of air for diffusing the liquid, and means for dispensing the treatment liquid inside the flow of diffusion air, dispensing means being in connection with a respective tank for containing the treatment liquid.

The prior art dispensing means comprise, inside the fan-style emission means, a plurality of dispensing bodies of the treatment liquid, wherein, in particular, the respective dispensing body has a respective inner chamber for conveying the liquid which extends between a single inlet opening of the liquid and a plurality of nozzles for escape of the liquid in the flow of diffusion air.

In practice, according to a prior art apparatus for dispensing treatment liquid, in order to obtain a sufficient amplitude of fan-shaped diffusion of the treatment liquid and to be able to adjust the emission of the treatment liquid along the same fan-shaped spray, it is necessary to position a plurality of dispensing bodies, for example, three, aligned with each other, at or inside the means for fan-style diffusion of the air flow.

The resulting times for assembly and maintenance, that is to say, cleaning of the dispensing body, are therefore excessively long.

Moreover, the plurality of separate units or bodies for dispensing the liquid form aerodynamic discontinuities inside the air flow with consequent flows of treatment product in an atomised or nebulised condition which are not very uniformly distributed and/or with consequent risks of unsatisfactory distribution of the product on the crop.

The need is therefore felt in the sector of having an apparatus for dispensing a treatment liquid on a respective agricultural crop or farmland wherein the fan-shaped diffusion has a distribution of liquid with a high degree of uniformity and homogeneity.

The need is also felt in the sector of having a dispensing body which has a construction cost which is low, at least relatively speaking.

FR1506530 discloses a plastic tank agricultural sprayer having diffusers that are directly mounted on the rear of the tank by means of flexible joints by which they can be oriented in any appropriate manner by keeping them in position by any adjustable locking system.

DISCLOSURE OF THE INVENTION

The present invention therefore proposes a new solution as an alternative to the solutions known up to now and, more specifically, proposes to overcome one or more of the above mentioned drawbacks or problems and/or to meet one or more of the needs felt in the trade or inferable from the above.

An apparatus is therefore provided for dispensing a treatment liquid to a respective agricultural crop, the liquid being in particular in the nebulised or atomised condition; comprising means for diffusing the treatment liquid, which comprise means for emitting a flow of air for diffusion of the treatment liquid, in particular fan-style diffusion, preferably according to a predetermined angular extension, and means for dispensing the treatment liquid inside the flow of air for diffusing the treatment liquid, connected with means, in particular a respective tank) for containing the treatment liquid; the dispensing means comprising a dispensing body having an inner chamber for conveying the liquid, respective inlet opening means, in particular of the treatment liquid, and leading into the inner conveying chamber, and nozzle means for escape of the liquid in the flow of air for diffusion of the treatment liquid, which opens in the inner conveying chamber; characterised in that the inlet opening means are defined by a plurality of openings leading into the inner chamber for conveying the liquid.

In this way, it is possible to obtain a dispensing body which allows assembly and maintenance times to be reduced and which, moreover, can be used in a particularly flexible or modular manner depending on the specific requirements of use necessary for the crop or farmland to be treated.

BRIEF DESCRIPTION OF THE DRAWINGS

These and other innovative aspects of the invention, or specific advantageous features, are set out in the appended claims and its technical features and advantages are apparent from the detailed description which follows of a preferred, advantageous embodiment of the apparatus, which must be considered purely as a non-limiting example. the description being made with reference to the accompanying drawings, in which:

FIGS. 3A to 3C are respective perspective view of different methods of use of the preferred embodiment of the dispensing body or unit of the apparatus according to this invention;

FIG. 4A is an exploded perspective view of the preferred embodiment of the dispensing body or unit according to this invention;

FIG. 4E is a cross section through the line IVE-IVE of FIG. 4D of a detail of an end zone;

FIG. 4F is a transversal cross section through the line IVF-IVF of FIG. 4C;

FIG. 4G is a transversal cross section through the line IVG-IVG of FIG. 4B;

FIG. 4H is a transversal cross section through the line IVH-IVH of FIG. 4B;

FIG. 5A is a perspective view of a preferred embodiment of the separator baffle which can be used in the apparatus according to this invention;

FIG. 5B is a perspective view, from the opposite side to FIG. 5A, of the preferred embodiment of the separator baffle which can be used in the apparatus according to this invention;

FIG. 5C is a front view of the preferred embodiment of the separator baffle which can be used in the apparatus according to this invention;

FIG. 5D is a side view of the preferred embodiment of the separator baffle which can be used in the apparatus according to this invention;

FIG. 5E is a rear view of the preferred embodiment of the separator baffle which can be used in the apparatus according to this invention;

FIG. 5F is a longitudinal cross section view of the preferred embodiment of the separator baffle which can be used in the apparatus according to this invention;

FIG. 5G is a transversal cross section view of the preferred embodiment of the separator baffle which can be used in the apparatus according to this invention;

FIG. 6A is a perspective view of a preferred embodiment of an end plug which can be used the apparatus according to this invention;

FIG. 6B is a perspective view, from the opposite side to FIG. 6A, of the preferred embodiment of the plug which can be used in the apparatus according to this invention;

FIG. 6C is a front view of the preferred embodiment of the plug which can be used in the apparatus according to this invention;

FIG. 6D is a lateral view of the preferred embodiment of the plug which can be used in the apparatus according to this invention;

FIG. 6E is a rear view of the preferred embodiment of the plug which can be used in the apparatus according to this invention;

FIG. 6F is a longitudinal cross section of the preferred embodiment of the plug which can be used in the apparatus according to this invention;

FIG. 6G is a transversal cross section of the preferred embodiment of the plug which can be used in the apparatus according to this invention;

FIG. 8A is a perspective view of a second preferred embodiment of the means or unit for limiting the flow of treatment liquid inside the conveying chamber;

FIG. 8B is a top plan view of the second preferred embodiment of the means or unit for limiting the flow of treatment liquid inside the conveying chamber;

FIG. 8C is a lateral view of the second preferred embodiment of the means or unit for limiting the flow of treatment liquid inside the conveying chamber;

FIG. 9A is a perspective view of just the supporting and fastening element or portion of the second preferred embodiment of the means or unit for limiting the flow of treatment liquid inside the conveying chamber;

FIG. 9B is a top plan view of the supporting and fastening element or portion of the means or unit for limiting the flow of treatment liquid inside the conveying chamber;

FIG. 9C is a lateral view of the supporting and fastening element or portion of the means or unit for limiting the flow of treatment liquid inside the conveying chamber;

FIG. 12A is a perspective view of a further preferred embodiment of the dispensing body;

FIGS. 12B and 12C are respective perspective views of details of the first and second part of the dispensing body according to the further preferred embodiment of FIG. 12A.

DETAILED DESCRIPTION OF PREFERRED EMBODIMENTS OF THE INVENTION

Figure 1A:
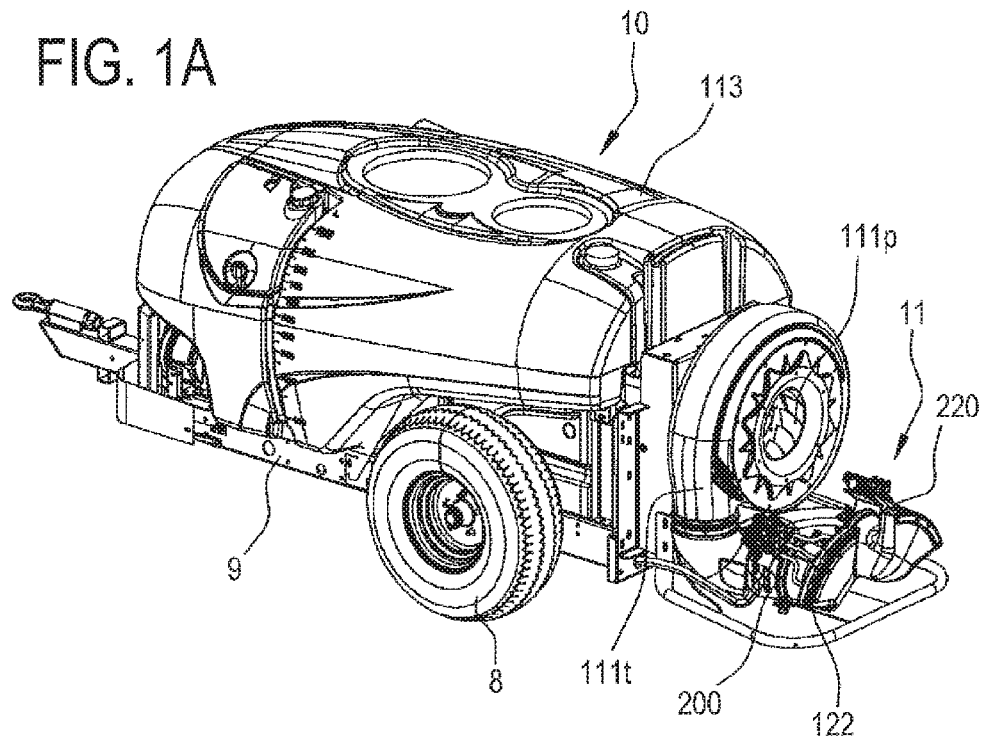
FIG. 1A is a perspective view of a preferred embodiment of the apparatus according to this invention.
Figure 1B:
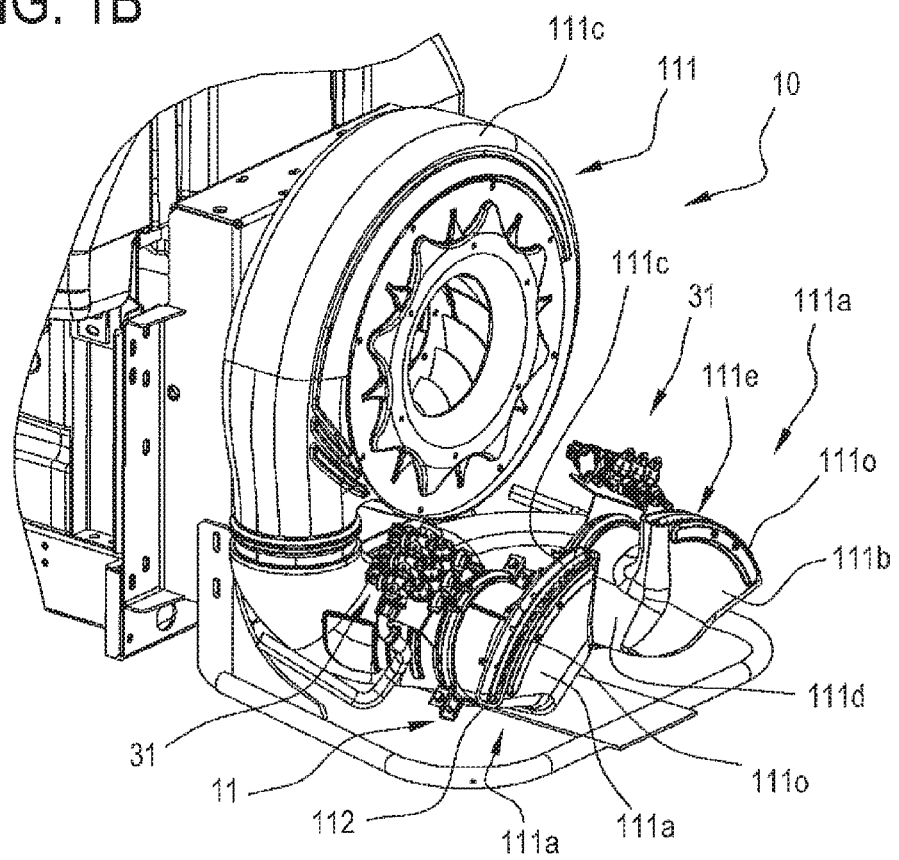
FIG. 1B is a perspective view of a detail of the preferred embodiment of the apparatus according to this invention.
Figure 2A:
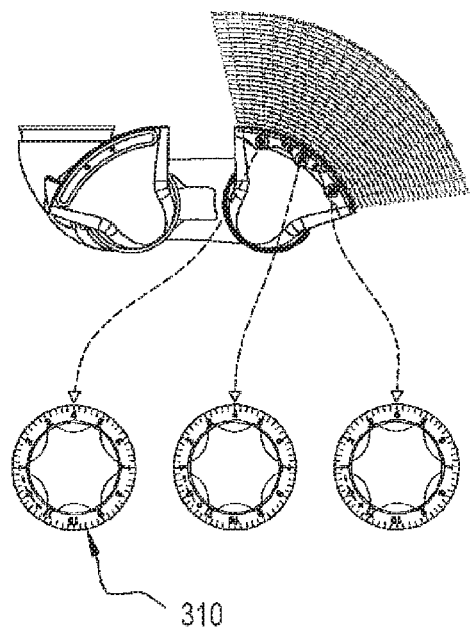
FIGS. 2A to 2D are respective perspective views of different methods of use of the preferred embodiment of the apparatus according to the invention.
Figure 2B:
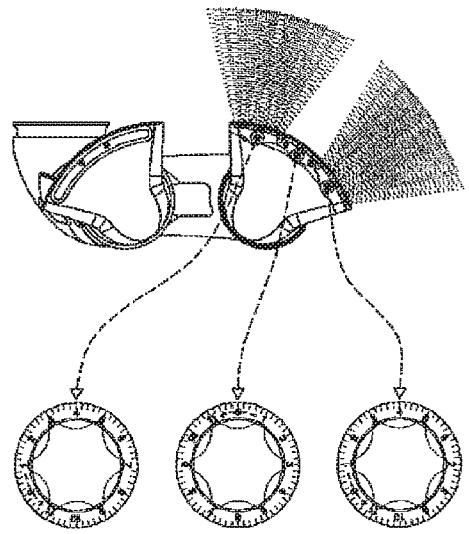
Figure 2C:
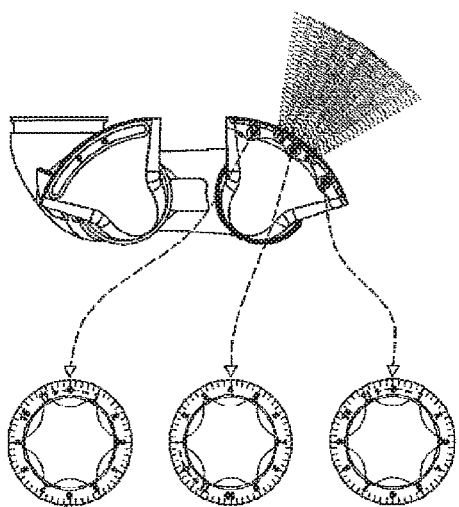
Figure 2D:
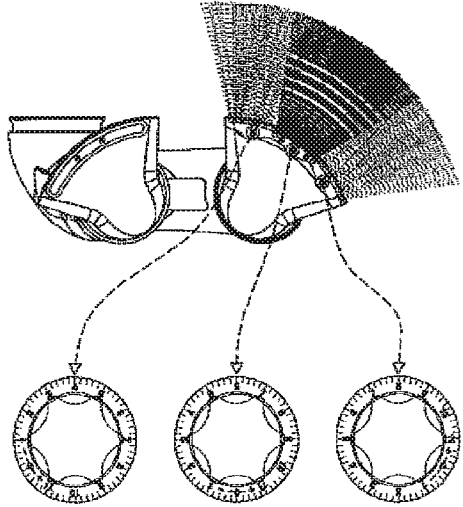

FIGS. 1 and 2 illustrate a preferred embodiment 10 of apparatus for dispensing a treatment liquid to, or on, a respective agricultural crop.

As illustrated, the apparatus 10 comprises means 11 for diffusing the treatment liquid towards, or on, the agricultural crop or farmland to be treated, the diffusing means comprising means 111 for emitting a flow of air for diffusing the treatment liquid, in particular fan-style diffusion of the flow of liquid, with the fan-shaped diffusion distributing, preferably, according to a predetermined angular extension.

More specifically, the diffusing means 111 comprise a respective diffuser body 111a, which is defined by a cylindrical tubular body, with a large diameter, which has an end portion 111c folded relative to the main tubular portion 111d, by a certain angle, and which is flattened in such a way as to define a wide fan-style outlet opening 111e of corresponding angular extension.

Advantageously, diffuser body 111a of the means for diffusing the treatment liquid has an end portion 111b for escape of the air which is folded relative to the main tubular portion 111*d*, by a certain angle, preferably greater than 90°. In this way, the jet of air can be sent towards the rear part of the apparatus and it is possible to obtain an optimum distribution of product on the agricultural crop.

The flow of air used for diffusing the treatment liquid on the crop or farmland is generated through corresponding means in particular in the form of a respective fan 111*p*, which is housed inside a corresponding body or casing, from which extends a respective delivery conduit 111*t*, which carries a corresponding flow of air towards to the respective diffuser body 111*a*.

As illustrated in FIGS. 1 and 2, the apparatus 10 comprises a first and a second diffuser body 111*a*, 111*a*, which are mounted behind the apparatus in such a way as to arrange the respective longitudinal axis of the main tubular portion 111*d* directed longitudinally to the apparatus and with the respective flattened terminal portions 111*b*, 111*b*, which are directed in substantially opposite directions, that is, towards the lateral zones of the apparatus.

As may be inferred, also with reference to the following drawings, the means 11 for diffusion of the treatment liquid comprise means 112 of dispensing the treatment liquid, inside the flow of air for diffusing the treatment liquid.

More specifically, the means for dispensing the treatment liquid 112 are in connection with respective means, in particular with a respective tank 113, for containing the treatment liquid.

As may be inferred in particular from FIG. 1, the tank 113 is supported by a corresponding frame 9, which is movable on respective wheels 8 and from which extends in cantilever fashion a supporting frame for the means 11 for diffusing the treatment liquid.

As may be inferred, in particular from FIGS. 4A to 4H, advantageously, the dispensing means comprise a dispensing body 12, which has an inner chamber 120 for conveying the liquid and which has respective inlet opening means 14, in particular of the treatment liquid, and leading into the inner conveying chamber 120, as well as nozzle means 15, for escape of the treatment liquid in the flow of air for diffusing the liquid, the nozzle means 15 opening into the inner conveying chamber 120 of the dispensing body 12.

More specifically, there are respective first and second pluralities of escape nozzles 15, 15, the first and second pluralities being provided on opposite sides of the dispensing body, as may be well inferred from FIG. 4I.

Advantageously, the inlet opening means 14 are formed by a plurality of openings 141, 142, 143, 144, 145 leading to, or opening into, the inner conveying chamber of the liquid.

In this way, it is possible to obtain a dispensing body which allows assembly and maintenance times to be reduced and which, moreover, can be used in a particularly flexible or modular manner depending on the specific requirements of use necessary for the crop or farmland to be treated, as will become clearer as this description continues.

More specifically, as shown in FIGS. 2A to 2D, thanks to this single dispensing body it is possible to diffuse the treatment liquid according to respective and desired operating configurations.

For example, a diffusing of the treatment liquid could be performed according to a complete fan-style configuration (FIG. 2A), or according to a configuration wherein only the lateral parts of the fan-shaped spray work (FIG. 2B), or according to a configuration wherein only the central part of the fan-shaped spray works (FIG. 2D), or even according to a configuration wherein the various parts of the fan-shaped spray work in a differentiated manner, with different fluid densities (FIG. 2D). It is understood that other operating configurations, in addition to those illustrated in the above-mentioned FIGS. 2A to 2D, are also imaginable.

More specifically, as illustrated, in the respective dispensing body 12, there is a central inlet opening 141.

More specifically, as illustrated, in the respective dispensing body 12 there are opposite lateral or end openings 142, 143 for entry of the liquid.

More specifically, as illustrated, in the respective dispensing body 12, there are opposite inlet openings 144, 145, which are especially positioned inside relative to the lateral or end openings 142, 143.

More specifically, as illustrated, each of the openings 144, 145 is positioned between the central opening 141 and the respective lateral or end opening 142 or 143.

In particular, as illustrated, the lateral or end openings 142, 143 are spaced from the respective end of the dispensing body 141, and in particular they are spaced from this to an extent corresponding or equal to the distance from the opening 144, 145 adjacent to this.

Advantageously, in practice, in the respective dispensing body 12 an odd number of inlet openings is used and more specifically five inlet openings 141, 142, 143, 144, 145 are used.

Advantageously, as illustrated, from the respective opening 141, 142, 143, 144, 145 extends a corresponding tubular outlet 121, 122, 123, 124, 125.

Advantageously, as may be inferred from FIG. 4F, the diameter of the surface 120', in particular the circumferentially extended surface, of the chamber 120 for conveying the dispensing body 12 is greater than the diameter of the respective inlet opening 141, 142, 143, 144, 145 of the treatment liquid, and/or of the corresponding tubular outlet 121, 122, 123, 124, 125 which extends from it.

Advantageously, as illustrated, the dispensing body 12 is in the form of an elongate tubular body, in particular open at opposite ends 12', 12", which extends, in use, substantially parallel to the curved end edge 1110 of the end portion of the diffuser body 111, the dispensing body 12 being positioned in the vicinity of the end edge.

More specifically, as illustrated, the dispensing body 12 is curved in such a way as to define a corresponding circular segment, having a respective radius of curvature.

Advantageously, as illustrated, each inlet opening, in particular for the treatment liquid 141, 142, 143, 144, 145, or the corresponding outlet 121, 122, 123, 124, 125, is provided on the concave side of the curved dispensing body 12.

Advantageously, as shown in particular in FIGS. 5A to 5G, there are means 16 for limiting the flow of treatment liquid inside the inner conveying chamber.

Advantageously, as illustrated, the means for limiting the flow of treatment liquid inside the conveying chamber 120 are in the form of means 16 for intercepting or closing the flow of liquid entering a respective inlet opening 141, 142, 143 provided in the dispensing body 12.

Advantageously, the means for limiting the flow of treatment liquid inside the conveying chamber 120 subdivide the conveying chamber 120 into a plurality of zones for flow of the corresponding treatment liquid which enters through a corresponding inlet opening 141, 142, 143 for the liquid.

Advantageously, as may be inferred, the means for limiting the flow of treatment liquid, that is, the means 16 for intercepting or closing the flow of liquid, entering from a respective inlet opening 141, 142, 143 can be engaged and disengaged from the dispensing body.

Advantageously, the means for limiting the flow of treatment liquid, that is, the means for intercepting or closing the flow of liquid, entering through a respective inlet opening 141, 142, 143 are in the form of corresponding partition means 16 which insert inside the conveying chamber 120 of the dispensing body 12.

Advantageously, the means for limiting the flow of treatment liquid, that is, the means 16 for intercepting or for closing the flow of liquid, entering through a respective inlet opening 141, 142, 143 are inserted inside the conveying chamber 120 through corresponding opening means provided in the dispensing body 12, in particular through a respective opening 144, 145, which may be used for the entry of the treatment liquid, especially through the respective outlet 124, 125 which extends from the respective inlet opening 144, 145 of the dispensing body 12, as may be well inferred from FIG. 3A.

Advantageously, it must however be understood that the tubular body, at the respective inlet opening 14, can also be connected to, instead of the above-mentioned unit, or means, 16 for intercepting or closing the flow of liquid entering, a respective plug 18 simply for closing the opening 14, as shown in FIG. 3B, the plug 18 being described in more detail below. In this way, it is possible to obtain an inner conveying chamber 120 which is completely, or at least largely, open along the respective length, or rather, completely, or at least partly, without intermediate closures or limitations of the flow of liquid along the same inner chamber.

It is also possible to connect, along the entire plurality of inlet openings of the dispensing body, respective means 20 which are designed to connect the dispensing body to respective means for feeding the treatment liquid, as illustrated in FIG. 3C, and which are in any case also described in more detail below.

Advantageously, the partition means for limiting or intercepting or closing the flow of liquid inside the conveying chamber 120 comprise, or are in the form of, a respective blade or flattened appendage 16, in particular having an elongate shape, and especially extending, in use, inside the conveying chamber 120 oriented transversally to the axis of the conveying chamber 120.

Advantageously, the blade or appendage 161 for limiting or intercepting or closing the flow of liquid inside the conveying chamber 120 has a respective free end 161a shaped, in particular with a circumferential profile, in such a way so as to match the profile of the opposite surface 120' of the inner chamber 120 for conveying the treatment liquid.

Advantageously, that the blade or appendage 161 for limiting or intercepting or closing the flow of liquid inside the conveying chamber 120 has large opposite flattened transversal faces 161b, 161c, extending between opposite longitudinally extended edges 161d, 161e, in particular parallel to each other.

More specifically, as illustrated, the means for limiting or intercepting or closing the flow of treatment liquid 16 comprise means 1601 for connecting to the dispensing body 12.

Further advantageously, the means for limiting or intercepting or closing the flow of treatment liquid 16 comprise gripping means 1610 for attaching or detaching the means for limiting or intercepting or closing the flow of treated liquid 16 to the dispensing body 12.

Advantageously, the means for connecting to the dispensing body 12, and/or the respective gripping means are defined by a corresponding block, in particular end block 1610, from which extend the partition means or respective blade 161 for limiting or intercepting or closing.

Advantageously, the block 1610, in particular the end block defining the means for connecting to the dispensing body 12, and/or the gripping means, comprise a corresponding perimeter sleeve 1611, in particular generally cylindrical, inside which extend coaxially the partition means or respective blade 161 for limiting or intercepting or closing.

Advantageously, the block, in particular end block 1610 defining the means for connecting to the dispensing body 12, and/or the gripping means, comprise a corresponding bottom wall 1612, from which extends the perimeter sleeve 1610, and from which extend perpendicularly or longitudinally the partition means or respective blade or appendage 161 for limiting or intercepting or closing.

Advantageously, as illustrated, the dispensing body 12 defines between adjacent inlet openings 141, 142, 143, 144, 145 a corresponding stretch 131, 132, 133, 134, 135, 136 for dispensing or escape of the liquid at which there are respective nozzle means 15.

Advantageously, as illustrated, the dispensing body 12 defines between adjacent inlet openings 141, 142, 143, 144, 145 a corresponding stretch 131, 132, 133, 134, 135, 136 for dispensing or escape of the liquid at which there are respective nozzle means 15.

More specifically, as illustrated, there are in total six sections of dispensing or escape of the liquid 131, 132, 133, 134, 135, 136, extending laterally to a respective opening for entry of the liquid in the dispensing body.

Figure 4B:
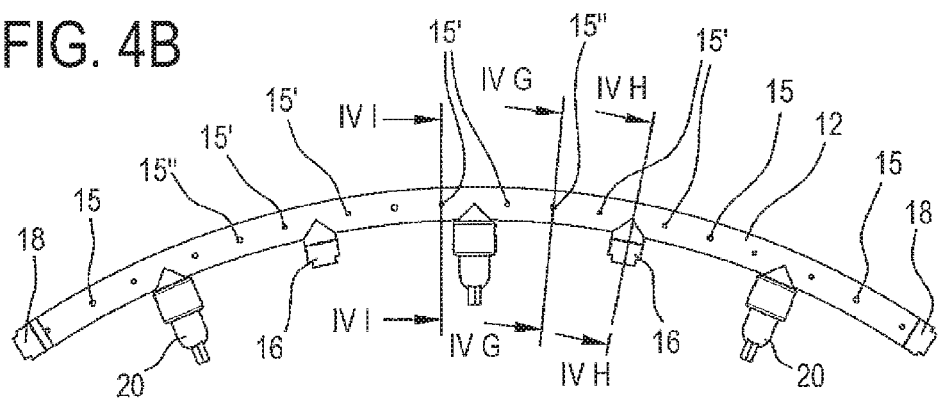
FIG. 4B is a front view of the preferred embodiment of the dispensing body or unit according to this invention.
Figure 4C:
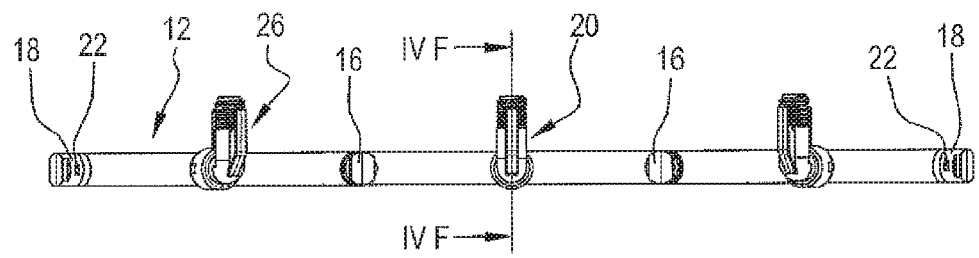
FIG. 4C is a rear view of the preferred embodiment of the dispensing body or unit according to this invention.
Figure 4D:
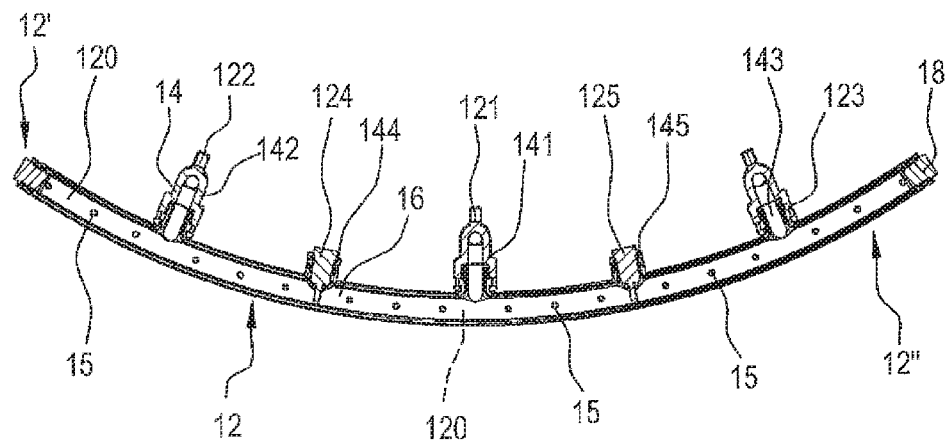
FIG. 4D is a cross section through the line IVD-IVD of FIG. 4C of the preferred embodiment of the preferred embodiment of the dispensing body or unit according to the invention.
Figure 4I:
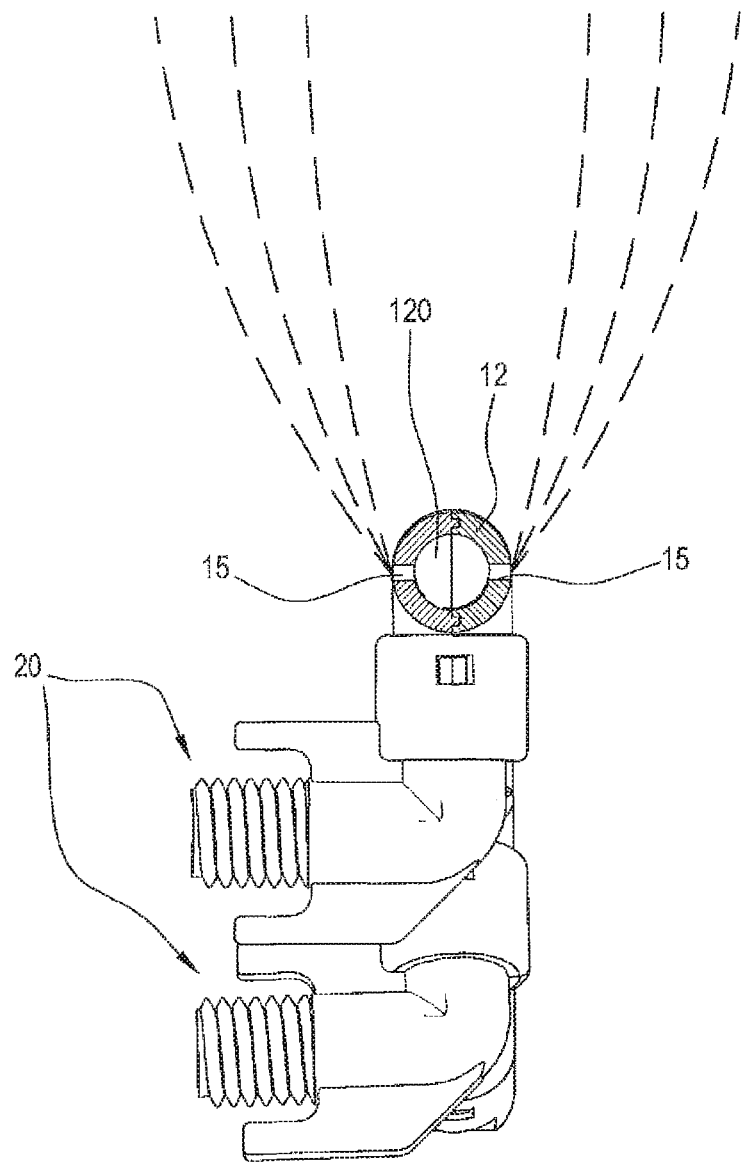
FIG. 4I is a cross section according to the line IVI-IVI of FIG. 4B.
Figure 7A:
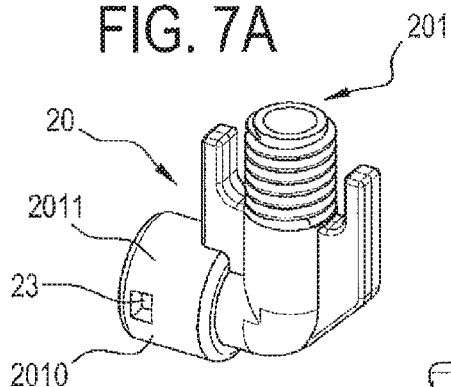
FIG. 7A is a perspective view of a preferred embodiment of a connector for a corresponding conduit of the treatment liquid which can be used in the apparatus according to this invention.
Figure 7B:
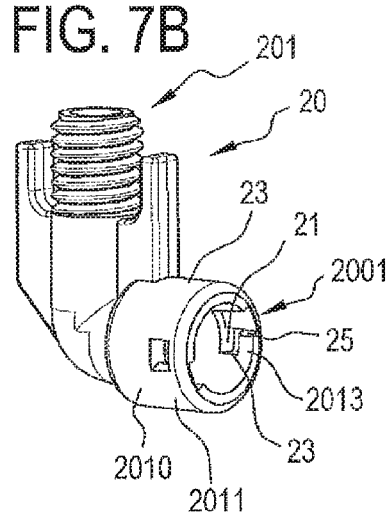
FIG. 7B is a perspective view, from the opposite side to FIG. 7A, of the preferred embodiment of the connector which can be used in the apparatus according to this invention.
Figure 7F:
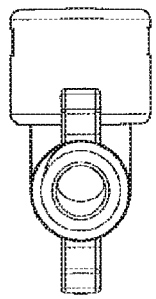
FIG. 7F is a top view of the preferred embodiment of the connector which can be used in the apparatus according to this invention.
Figure 7C:
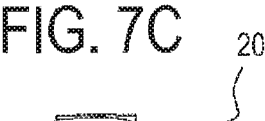
FIG. 7C is a front view of the preferred embodiment of the connector which can be used in the apparatus according to this invention.
Figure 7D:
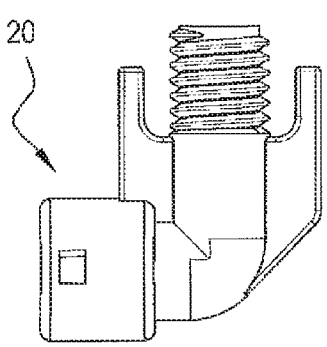
FIG. 7D is a lateral view of the preferred embodiment of the connector which can be used in the apparatus according to this invention.
Figure 7E:
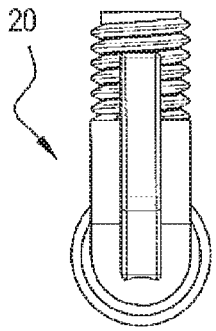
FIG. 7E is a rear view of the preferred embodiment of the connector which can be used in the apparatus according to this invention.
Figure 7H:
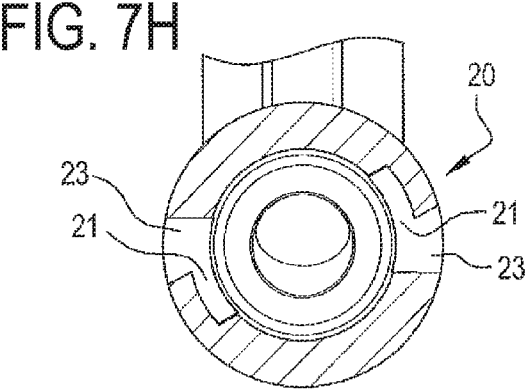
FIG. 7H is an enlarged transversal cross section of a portion of the preferred embodiment of the connector which can be used in the apparatus according to this invention.
Figure 7G:
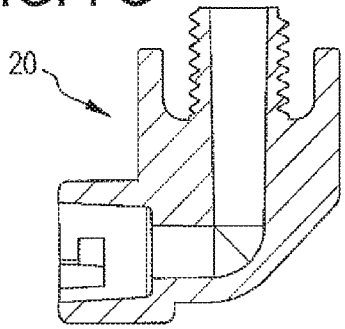
FIG. 7G is a longitudinal cross section of the preferred embodiment of the connector which can be used in the apparatus according to this invention.
Figure 10A:
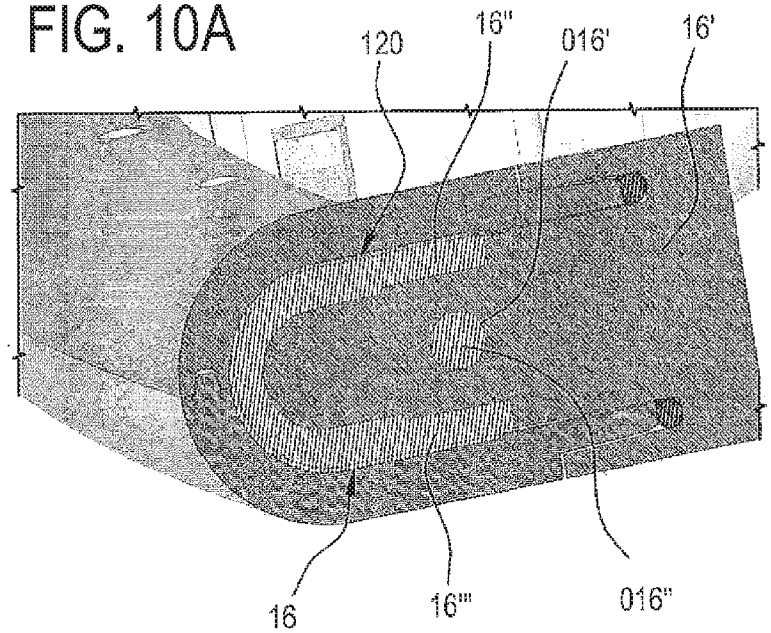
FIG. 10A is a transversal cross section of the dispensing body mounting the second preferred embodiment of the means or element for limiting the flow of treatment liquid inside the conveying chamber.
Figure 10B:
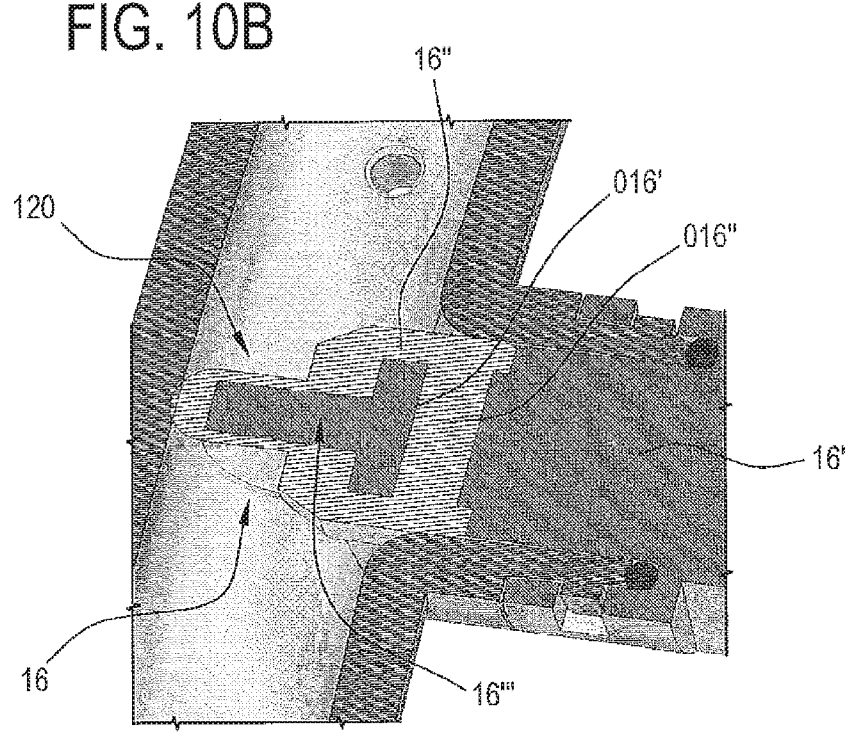
FIG. 10B is a longitudinal cross section of the dispensing body mounting the second preferred embodiment of the means or element for limiting the flow of treatment liquid inside the conveying chamber.

Advantageously, the dispensing body 12 has a plurality, in particular a first and a second plurality, of nozzles, or calibrated holes, 15 for dispensing or escape of the liquid, preferably the second plurality of nozzles, or calibrated holes 15 for dispensing or escape of the liquid being provided on the side opposite the first plurality of nozzles or holes 15, in particular with the respective nozzles of the first and second plurality of nozzles 15, 15 being transversally coincident, or substantially coincident, with each other, as may be inferred from FIG. 4I.

In this way, if a respective hole or nozzle of a respective plurality of holes or nozzles is blocked, the opposite hole at that specific longitudinal position nevertheless remains open, in this way guaranteeing a sufficient dispensing of treatment liquid at the respective longitudinal position where the blocked hole or nozzle is located.

In practice, the dispensing body 12 has respective pluralities of nozzles, or calibrated holes, 15 for dispensing or escape of the liquid, in particular at the respective stretch for dispensing or escape of the liquid.

More specifically, as illustrated, the nozzles, or calibrated holes, 15 are preferably distributed along the entire dispensing body 12.

Advantageously, as may be inferred, the nozzles, or calibrated holes, 15 are provided on the respective face of the dispensing body 12, which is perpendicular to that in which are provided the openings 141, 142, 143, 144, 145.

Advantageously, in the respective stretch 131, 132, 133, 134, 135, 136 for dispensing or escape of the liquid a number corresponding to two or more calibrated holes, or nozzles, 15 is provided, in particular in the respective stretch for dispensing or escape of the liquid 131, 132, 133, 134 between adjacent inlet openings 141, 142, 143, 144, 145 an odd number of calibrated holes, or nozzles is provided and preferably three or more holes calibrated or nozzles are provided.

Advantageously, as may be inferred in particular in FIG. 4B, at the stretch of the dispensing body 12 at which the respective inlet opening 14 emerges, no nozzles, or calibrated holes, 15 are provided.

Advantageously, the nozzles, or calibrated holes, 15' which are provided adjacent to the respective inlet opening 14 have a diameter greater, in particular of between 1.2 mm and 1.7 mm, to that of the other holes of the nozzles, or calibrated holes, 15", which have in particular a diameter of between 1.5 mm and 2.0 mm.

Advantageously, the distance between the nozzles, or calibrated holes, 15 between which is provided the respective inlet opening 14 is greater than the distance between the nozzles, or calibrated holes, 15 between which there is no inlet opening 14.

In this way, an optimum distribution of treatment liquid is obtained in the flow of diffusion air and therefore an optimum distribution of treatment product on the agricultural cop or farmland.

Advantageously, as illustrated in particular in FIGS. 6A to 6G, there are means 18 for closing the respective open end of the dispensing body 12 and/or of the respective inlet opening 14.

Advantageously, the means 18 for closing the respective open end of the dispensing body and/or the respective inlet opening 14 can be engaged with and disengaged from the dispensing body 12.

Advantageously, the means 18 for closing the respective open end of the dispensing body, and/or the respective inlet opening 14, comprise a plug body 181, preferably with an outer cylindrical profile, which can be inserted axially in the dispensing body 12.

Advantageously, the means 18 for closing the respective open end of the dispensing body 12 and/or the respective inlet opening 14, comprise means 1801 for connecting to the dispensing body 12.

Advantageously, the means 18 for closing the respective open end of the dispensing body 12, and/or the respective inlet opening 14, comprise gripping means 1810, which are suitable to allow attaching or detaching of the closing means of the respective open end of the dispensing body 12.

Advantageously, the means for connecting to the dispensing body 12, and/or the respective gripping means, are defined by a corresponding block, in particular end block 1810, from which extend the closing plug means 181.

Advantageously, the block, in particular end block 1810 defining the means for connecting to the dispensing body 12, and/or respective gripping means, comprise a corresponding perimeter sleeve 1811, in particular generally cylindrical, inside which extend coaxially the closing plug means 181.

Advantageously, the block, in particular end block 1810 defining the means for connecting to the dispensing body 12, and/or respective gripping means, comprise a corresponding bottom wall 1812, from which extends, in particular, the perimeter sleeve 1810, and from which extend perpendicularly or longitudinally the closing plug means 181.

Advantageously, as illustrated in particular in FIGS. 7A to 7G, there are means 20 for connecting to corresponding conduit means 200 for the treatment liquid.

Advantageously, the connecting means 20 for the conduit means 200 can be engaged with and disengaged from the dispensing body 12.

Advantageously, the connecting means 20 for the conduit means 200 comprise a bushing 201, in particular threaded for insertion of the end of a respective flexible conduit for connecting to the containment means or tank, in particular the bushing 201 being inclined at a respective angle, in particular being oriented perpendicularly relative to the corresponding outlet 121, 122, 123 of the dispensing body or to the axis of the corresponding opening and/or to the dispensing body 12, to which it is associated.

Advantageously, the connecting means 20 for the conduit means 200 comprise means 2001 for connecting to the dispensing body 12.

Advantageously, the connecting means 20 for the conduit means 200 comprise gripping means 2010 for attaching or detaching the means 20 for connecting the conduit means 200 to the dispensing body 12.

Advantageously, also in this case, the means for connecting to the dispensing body 12, and/or the respective gripping means, are defined by a corresponding block, in particular end block 2010.

More specifically, as illustrated, the block, in particular end block 2010 defining the means for connecting to the dispensing body 12, and/or the gripping means, comprise a corresponding perimeter sleeve 2011, in particular generally cylindrical.

Advantageously, as may be inferred from the corresponding drawings, the means 1601, 1801, 2001 for connecting to the dispensing body 12 are in the form of means for engaging and disengaging from the dispensing body, through a corresponding advantageous manoeuvre which is performed through the relative gripping means.

Advantageously, as illustrated, the means 1601, 1801, 2001 for connecting to the dispensing body 12 are in the form of means for axial insertion on the outlet 124, 125 at the respective opening 144, 145 of the dispensing body 12 and/or on the respective end portion 12', 12" of the dispensing body 12.

Advantageously, the means 1601, 1801, 2001 for connecting to the dispensing body are in the form of means for engaging with and disengaging from the dispensing body 12, in particular with the outlet 124, 125 at the respective opening 144, 145 of the dispensing body 12 and/or on the respective end portion 12', 12" of the dispensing body 12 by a corresponding rotary movement, in particular a rotary movement of approximately 90°.

Advantageously, the means 1601, 1801, 2001 for connecting to the dispensing body 12 comprise seat means, in particular in the form of first and a second radially opposite seats, 21, 21 provided inside the sleeve 1611, 1811, 2011 of the respective connecting block 1610, 1810, 2010, which receive corresponding insertion means, in particular first and second radially opposite teeth 22, 22, protruding from the dispensing body 12, in particular from the respective outlet 124, 125 at the respective opening 144, 145 of the dispensing body 12 and/or from the respective end portion 12', 12" of the dispensing body 12.

Advantageously, the insertion means, in particular the first and second opposite teeth, 22, 22, protruding from the dispensing body 12, in particular from the outlet 124, 125 at the respective opening 144, 145 of the dispensing body 12 and/or from the respective end portion 12', 12" of the dispensing body 12, are inserted into corresponding hole means, preferably through holes, in particular in the form of first and second radially opposite holes 23, 23, provided in the sleeve 1611, 1811, 2011 of the respective connecting block 1610, 1810, 2010.

More specifically, as illustrated, the seat means, in particular in the form of first and second opposite seats, 21, 21 comprise a respective circumferential groove 24, 24 which is recessed with respect to the inner surface 1613, 1813, 2013 of the perimeter sleeve and in particular leading into the hole means 23, 23; the respective groove defining means for retaining and sliding of the relative insertion tooth towards the hole means 23, 23.

The groove 24, 24 has a respective axial portion 25, 25, at the end opposite the end of the respective hole 23, 23, which defines a corresponding passage for the insertion means, or teeth, 22, 22 protruding from the dispensing body 12, in particular protruding from an end portion which is radially recessed or thinned of the outlet 124, 125, at the respective opening 144, 145 of the dispensing body 12, and/or from an edge portion which is radially recessed or thinned of the respective end portion 12', 12" of the dispensing body 12.

Advantageously, as illustrated, the outlet 124, 125 at the respective opening 144, 145 of the dispensing body 12, and/or the respective end portion 12', 12", of the dispensing body 12 inserts between the respective perimeter sleeve 1611, 1811 and a corresponding circumferential portion 160, 180 of the partition means 161, and/or the plug means 181.

More specifically, as illustrated, the flow limiting or partition means 16 comprise a circumferential portion 160 for connecting to the corresponding block 1610 and from which extends the blade or appendage portion 161 for inserting inside the dispensing body 12.

More specifically, as illustrated, the plug means 18 have a tapered or bevelled free end 184 for inserting in the end opening 12', 12" of the dispensing body 12.

Advantageously, there are seal means 26, in particular in the form of a respective seal, or O-ring, which are positioned between the outlet 124, 125 at the respective opening 144, 145 of the dispensing body 12, and/or between the respective end portion 12', 12" of the dispensing body 12, and the block 1610, 1810, and in particular between the end edge of the outlet 124, 125, at the respective opening 144, 145 of the dispensing body 12, and/or between the respective end portion 12', 12" of the dispensing body 12, and the corresponding bottom wall 1612, 1812 of the respective block.

Advantageously, there are means 30 for indicating the angular position of means for limiting or intercepting, and/or means for closing the respective end of the dispensing body 12.

Advantageously, the means 30 for indicating the angular position of the limiting or interception means and/or the means for closing the respective end of the dispensing body 12 are provided on the respective gripping means of the limiting or interception means and/or the means for closing the respective end of the dispensing body 12.

Advantageously, the means for indicating the angular position of the limiting or interception means and/or the means for closing the respective end of the dispensing body 12 are in the form of a protruding strip 30 provided on the respective gripping means 1810, 1610, in particular on the bottom wall 1612, 1812.

Advantageously, the dispensing body 12 is made of moulded plastic material, and is preferably defined by two pieces, in particular which mirror each other, facing each other and joined together.

Moreover, the relative components 16, 18, 20 of this dispensing body are also preferably made in plastic material.

Advantageously, means 31 for adjusting the flow or flow rate of the treatment liquid towards the dispensing means, in particular towards the corresponding inlet opening of the treatment liquid in the dispensing body, in particular the adjusting means are provided in a zone upstream of the conduit means 200 for conveying the treatment liquid to the dispensing body.

More specifically, as illustrated in FIGS. 2A to 2D, the means for adjusting the flow or flow rate of the treatment liquid towards the dispensing means can be operated manually, in particular using a corresponding knob 310, preferably numbered, defining a plurality of positions for adjusting the flow.

More specifically, the apparatus according to the invention comprises means for pumping the treatment liquid, in particular in the form of means designed to flow the liquid at a low-pressure to the dispensing body 12 and out from the corresponding nozzle means 15.

FIGS. 8A to 10B illustrates a further, or second, preferred embodiment of the means 16 for limiting or intercepting the flow of liquid inside the conveying chamber 120, which has components similar, or equivalent, to those of the first preferred embodiment, which are denoted by the same reference labels and which, to avoid making this description too long, are not described again in detail.

This second preferred embodiment of the means 16 for limiting or intercepting the flow of liquid inside the conveying chamber 120 differs in that, advantageously, the means 16 for limiting or intercepting the flow of liquid inside the conveying chamber 120, that is, in particular, the respective blade or appendage 161, comprise respective elastically yieldable means which are designed to engage the corresponding inner surface of the conveying chamber 120.

Advantageously, this ensures a completely hermetic seal against any losses or leaks of the treatment liquid towards undesired areas of the conveying chamber.

Advantageously, the means for limiting or intercepting the flow of treatment liquid 16 comprise a supporting portion 16', in particular defining the means 1601 for connecting to the dispensing body 12, and/or the respective gripping means, preferably made of rigid material, especially made of a rigid plastic material, and a portion 16" defining the elastically yieldable means which are designed to engage, in use, the corresponding inner surface of the conveying chamber 120.

Advantageously, as may be inferred from FIGS. 9A to 9C, the supporting portion 16' has a protruding part 16''', in particular longitudinally or frontally, which supports, in particular in the inserted condition on the protruding part 16''', the portion 16" defining the elastically yieldable means for engaging the corresponding inner surface of the conveying chamber 120.

Advantageously, the portion 16" defining the elastically yieldable means for engaging the corresponding inner surface of the conveying chamber 120 is obtained through moulding a corresponding plastic material on the supporting portion 16'.

Advantageously, there are retaining means 016', in particular undercut relative to the direction of withdrawal from the dispensing body, of the portion 16" defining the elastically yieldable means for engaging the corresponding inner surface of the conveying chamber 120, to the respective supporting portion 16'.

Advantageously, the retaining means comprise a corresponding hole 016' provided in the supporting portion 16', in particular in the protruding connection part 16''', within which hole 016' is inserted the material 016" of the portion 16" defining the elastically yieldable means for engaging the corresponding inner surface of the conveying chamber 120.

Advantageously, the protruding connecting part 16''' has a cross section 016''' with a flattened shape according to the plane of extension of the blade portion 161 and defining means designed to exert a convenient and advantageous action of rotation of the portion 16" defining elastically yieldable means for engaging the corresponding inner surface of the conveying chamber 120, in particular when the means for limiting or closing the flow of liquid 16 are engaged with and disengaged from the dispensing body.

Advantageously, the protruding connecting part 16''' has a wide base section 0160''' from which extends the section 016 with a flattened shape and, more specifically, in the base section 0160''' there being made or set up the retaining means, or transversal hole, 016'.

More specifically, as illustrated, the outer portion 16" made of elastically compliant material comprises an inner cavity opening at the rear side thereof, the inner cavity being defined by a surface which comes into contact with the outer surface of the protruding connecting part 016''' and a pin element 016" which is inserted into the retaining hole 016'.

More specifically, as illustrated, the end portion 16" made of elastically yieldable material has a perimetric edge 16b" which is curved or concave towards the outside of the blade or appendage portion.

Figure 11:
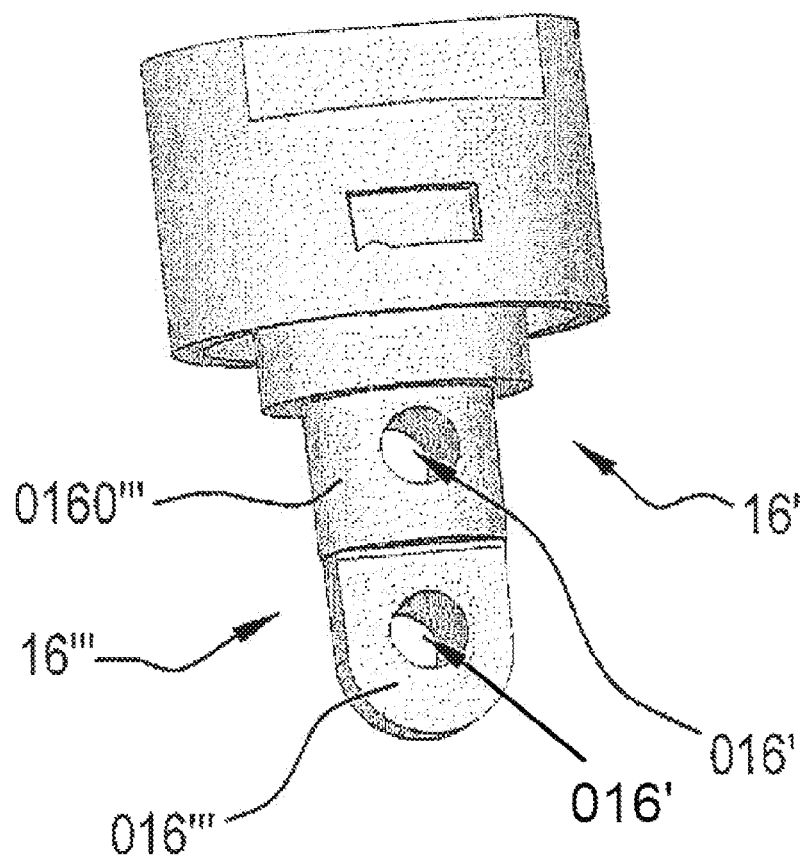
FIG. 11 is a perspective view of a further preferred embodiment for the supporting portion of the portion defining the elastically yieldable means which are designed to engage, in use, the corresponding inner surface of the conveying chamber of the shutter body.

FIG. 11 illustrates a further preferred embodiment for the supporting portion 16' of the portion 16" defining the elastically yieldable means which are designed to engage, in use, the corresponding inner surface of the conveying chamber 120.

This further preferred embodiment of the support portion 16' has components similar, or equivalent, to those of the previous preferred embodiment illustrated in FIGS. 9A to 9C, which are denoted by the same reference numerals and which, for brevity and convenience, are not described again in detail.

This further preferred embodiment of the supporting portion 16' comprises means for retaining the elastically yieldable means which are designed to engage, in use, the corresponding inner surface of the conveying chamber 120, which comprise a plurality of transversal holes 016', 016', in particular in the form of a first and a second hole, provided in the supporting portion 16', preferably in the protruding connection part 16''', within which hole 016' is inserted the material of the portion 16" defining the elastically yieldable means for engaging the corresponding inner surface of the conveying chamber 120.

More specifically, in this further preferred embodiment, the protruding connecting part 16''' has an end cross section 016''' with a flattened shape in which there is a corresponding transversal retaining hole 016', whilst a second transversal hole 016' is provided, in a similar fashion to the first preferred embodiment, in the wide base section 0160''' from which extends the section 016 with a flattened shape.

Basically, in this way it is evident that the means for retaining the elastically yieldable means, which are designed to engage, in use, the corresponding inner surface of the conveying chamber 120, can comprise one or more transversal holes 016', 016', in particular in the form of a first and a second hole, provided in the supporting portion 16', preferably in the protruding connection part 16''', within which holes 016' is inserted the material of the portion 16" defining the elastically yieldable means for engaging the corresponding inner surface of the conveying chamber 120.

Thus, an apparatus has been provided for dispensing a treatment liquid on a respective agricultural crop or farmland, the liquid in particular being in a nebulised or atomised condition, the apparatus allowing an assembly and/or a maintenance, that is cleaning of the dispensing body, which is particularly easy and which can be performed in a short time, and, moreover, it being possible to use the apparatus in a particularly flexible or modular manner depending on the specific requirements of use necessary for the crop or farmland to be treated, and which also allows an optimum distribution of the treatment liquid in the diffusion flow on the crop.

More specifically, for cleaning the entire dispensing body, it is sufficient to remove the corresponding dividing partitions and the lateral closing plugs, in such a way as to feed a corresponding washing liquid inside the chamber 120 of the dispensing body.

Moreover, this dispensing body 12, and relative components 16, 18, 20, have a particularly low construction cost.

FIGS. 12A to 12C illustrate a further preferred embodiment of the dispensing body 012 according to this invention, which has substantially the same components as the preferred embodiment described above, which are labelled with the same reference labels and which, to avoid making this description too lengthy, will not be however commented upon again in detail.

As may be inferred from the drawings, this dispensing body 012, like the previous dispensing body 12, is composed of a first and a second part 0120, 0121 with a semi-circular cross-section which are facing each other and joined together by corresponding slats 0122 protruding from a corresponding face the respective part of the dispensing body and inserting into corresponding receiving cavities 0123 of the protruding slats which are provided on the opposite face of the other part of the dispensing body.

This further preferred embodiment of the dispensing body 012, unlike the preferred embodiment described above, for each of the component parts 0120, 0121 comprises respective lip means, in particular a first and a second elongate lip 0124, 1024, protruding externally from the respective outer side of the respective part of the dispensing body, the lip means 0124 of the respective part 0120 of the dispensing body defining the respective faces opposite the faces of the lip means 0124 of the other part 0121 of the dispensing body, the faces of the lip means being coplanar to the corresponding positioning faces of the slats 0122 and the cavity 0123 for reciprocal engagement of the first and second parts 0120, 0121 of the dispensing body 012.

In this way, a larger surface is defined for the mutual coupling between the first and second parts 0120, 0121 of the dispensing body 012.

The invention described has evident industrial applications. It would be obvious to one skilled in the art that several changes and modifications can be made to the invention without departing from the spirit and scope of the invention, described in depth above. It is also easy to imagine further preferred embodiments of the invention comprising one or more of the features described herein. Moreover, it will be understood that all the details of the invention may be substituted for technically equivalent elements.

The invention claimed is:

1. An apparatus for dispensing a treatment liquid to a respective agricultural crop, the treatment liquid being in a nebulized or atomized condition; comprising:
   a diffuser for diffusing the treatment liquid, the diffuser including a source of air for emitting a flow of air for diffusion of the treatment liquid in a fan shape having a predetermined angular extension, and
   a dispensing system for dispensing the treatment liquid inside the flow of air connected to a tank for containing the treatment liquid;
   the dispensing system comprising:
   a dispensing body having an inner conveying chamber for conveying the treatment liquid,
   at least one inlet connected to the dispensing body and including at least one inlet opening for the treatment liquid leading into the inner conveying chamber, and at least one nozzle for injecting the treatment liquid into the flow of air for diffusion of the treatment liquid, the at least one nozzle opening into the inner conveying chamber;

at least one flow limiter for limiting a flow of treatment liquid inside the inner conveying chamber;

the at least one flow limiter subdividing the inner conveying chamber into a plurality of zones for controlling flow of the treatment liquid entering the inner conveying chamber through the at least one inlet opening;

wherein the at least one flow limiter and the at least one inlet are connected to the dispensing body through at least one outlet;

the at least one flow limiter including a blade or appendage extending into the inner conveying chamber and having a longitudinal axis oriented transversally to an axis of the inner conveying chamber; and the blade or appendage extending into the inner conveying chamber between opposite lateral ends of the inner conveying chamber to divide the inner conveying chamber into at least two separate sub-chambers positioned on opposite sides of the blade or appendage.

2. The apparatus according to claim 1, wherein the at least one inlet includes a plurality of inlets with a plurality of inlet openings leading into the inner conveying chamber.

3. The apparatus according to claim 2, wherein the plurality of inlet openings are distributed unifomly or mutually equispaced along the dispenser body.

4. The apparatus according to claim 2, wherein the plurality of inlet openings includes a central inlet opening, opposite lateral or end inlet openings and opposite inlet openings which are positioned between the central inlet opening and the respective lateral or end inlet openings.

5. The apparatus according to claim 1, wherein the dispensing body is an elongate tubular body open at the opposite lateral ends.

6. The apparatus according to claim 5, wherein the dispensing body is curved and extends to define a corresponding circular segment.

7. The apparatus according to claim 1, wherein the at least one flow limiter is engageable with and disengageable from the dispensing body.

8. The apparatus according to claim 1, wherein the blade or appendage includes a free end extending furthest into the inner conveying chamber, the free end having a profile matching an opposing inner surface of the inner conveying chamber.

9. The apparatus according to claim 1, wherein the at least one flow limiter includes a connector for connecting to the dispensing body, the connector including a gripping surface for engaging the dispensing body.

10. The apparatus according to claim 1, wherein the at least one nozzle includes a first plurality and a second plurality, of nozzles, or calibrated holes, the second plurality of nozzles, or calibrated holes being positioned on a second side of the dispensing body opposite a first side of the dispensing body including the first plurality of nozzles or calibrated holes, with respective ones of the first plurality and the second plurality of nozzles or calibrated holes being coincident to one another on the opposite first and second sides of the dispensing body.

11. The apparatus according to claim 10, wherein the first and second plurality of nozzles, or calibrated holes, are distributed along an entirety of the dispensing body.

12. The apparatus according to claim 10, wherein the first and second plurality of nozzles, or calibrated holes, are positioned on a second face of the dispensing body which is perpendicular a first face of the dispensing body in which the at least one inlet opening is positioned.

13. The apparatus according to claim 1, and further comprising at least one closing member for closing at least one chosen from the at least one inlet opening and an open end of the dispensing body.

14. The apparatus according to claim 13, wherein the at least one closing member is engageable with and disengageable from the at least one chosen from the at least one inlet opening and the open end of the dispensing body.

15. The apparatus according to claim 13, wherein the at least one closing member includes a plug body, with an outer cylindrical profile, for insertion axially into the dispensing body, and a gripping surface for engaging the dispensing body.

16. The apparatus according to claim 1, and further comprising a connector connecting the dispensing body to a conduit of the tank.

17. The apparatus according to claim 16, wherein the connector is engageable with and disengageable from the dispensing body.

18. The apparatus according to claim 16, wherein the connector comprises a gripping surface for engaging the dispensing body.

* * * * *